(12) United States Patent
Harpenau

(10) Patent No.: US 7,210,505 B2
(45) Date of Patent: May 1, 2007

(54) ELBOW FOR A CONDUIT

(76) Inventor: Richard J. Harpenau, 6190 Sand Pine Ct., Jupiter, FL (US) 33458

( * ) Notice: Subject to any disclaimer, the term of this patent is extended or adjusted under 35 U.S.C. 154(b) by 0 days.

(21) Appl. No.: 10/987,234

(22) Filed: Nov. 12, 2004

(65) Prior Publication Data

US 2006/0102242 A1 May 18, 2006

(51) Int. Cl.
*F16L 9/00* (2006.01)
*H02G 15/113* (2006.01)

(52) U.S. Cl. ............... 138/157; 138/162; 285/179; 285/182; 285/183; 174/92

(58) Field of Classification Search ........ 138/157–163, 138/109, 155; 285/179–183
See application file for complete search history.

(56) References Cited

U.S. PATENT DOCUMENTS

| 85,843 | A | * | 1/1869 | Niedringhaus | ............... 285/183 |
|---|---|---|---|---|---|
| 165,302 | A | * | 7/1875 | Butler | ............... 137/247.49 |
| 340,800 | A | * | 4/1886 | Markoe | ............... 138/163 |
| 653,311 | A | * | 7/1900 | Pfeil | ............... 285/182 |
| 777,552 | A | * | 12/1904 | Smith | ............... 285/182 |
| 842,580 | A | * | 1/1907 | Plecker | ............... 285/183 |
| 1,083,756 | A | * | 1/1914 | Phelps | ............... 285/406 |
| 1,122,632 | A | * | 12/1914 | Phelps | ............... 285/383 |
| 1,832,350 | A | * | 11/1931 | Beaver | ............... 285/61 |
| 1,832,351 | A | * | 11/1931 | Beaver | ............... 285/61 |
| 3,153,546 | A | * | 10/1964 | Dunn | ............... 285/13 |
| 3,239,254 | A | * | 3/1966 | Campbell | ............... 285/390 |
| 3,255,302 | A | * | 6/1966 | Frank, Jr. | ............... 174/138 F |
| 3,559,694 | A | * | 2/1971 | Volberg | ............... 138/147 |
| 4,018,979 | A | * | 4/1977 | Young | ............... 174/35 C |
| 4,620,815 | A | * | 11/1986 | Goetter | ............... 411/84 |
| 4,964,815 | A | * | 10/1990 | Kawai et al. | ............... 439/610 |
| 5,007,666 | A | * | 4/1991 | Kyfes | ............... 285/373 |
| 5,066,050 | A | * | 11/1991 | Kretchman | ............... 285/319 |
| D351,588 | S | * | 10/1994 | McCain | ............... D13/154 |
| 5,977,482 | A | * | 11/1999 | Skopic et al. | ............... 174/92 |
| 6,179,343 | B1 | * | 1/2001 | Byrnes | ............... 285/184 |
| 6,376,774 | B1 | * | 4/2002 | Oh et al. | ............... 174/92 |
| 6,450,551 | B1 | * | 9/2002 | Lee | ............... 285/373 |

* cited by examiner

*Primary Examiner*—Patrick F. Brinson
(74) *Attorney, Agent, or Firm*—Akerman Senterfitt

(57) ABSTRACT

An elbow for a dryer exhaust vent conduit. The elbow can have two nestable channel sections, each channel section having a generally C-shaped cross-section, which may be substantially semi-circular. Each channel section has a connection mechanism along at least one side such that the two channel sections are joinable to form a substantially tubular conduit which has a smooth interior surface, reducing friction losses to the airflow speed of the dryer exhaust. Each channel section can be curved in a large radius arc to provide a turn to the elbow, which may extend around a quarter circle to provide a 90° turn to the dryer exhaust vent conduit. Snap fit locking tabs may lock the two channel sections together. Ends of the elbow may fit into or outside adjoining conduit pipes. The channel sections can be nested for ease of transport and storage and can be easily assembled on site.

8 Claims, 2 Drawing Sheets

ELBOW FOR A CONDUIT

STATEMENT REGARDING FEDERALLY SPONSORED RESEARCH OR DEVELOPMENT (Not Applicable)

CROSS-REFERENCE TO RELATED APPLICATIONS (Not Applicable)

BACKGROUND

1. Technical Field

The present invention relates to exhaust vent systems, and more particularly to an elbow for a dryer exhaust vent conduit.

2. Description of Related Art

A clothes dryer requires a vent to the exterior, which is typically achieved using an exhaust conduit that is enclosed in a wall cavity and which conveys heated air and lint from the dryer to the exterior of the building in which the dryer is placed. The dryer can include a flexible transition hose which connects the dryer appliance to the exhaust conduit. In a common installation configuration, the exhaust conduit within the wall cavity is vertical, and is angled at the bottom of the vertical section in an elbow so that it protrudes horizontally from the wall surface, with the flexible hose leading from the dryer appliance attached to the horizontal section of the conduit. The exhaust conduit may also be angled at the top of the vertical section in a second elbow to allow for a horizontal venting through a wall outlet, or may remain vertical and vent to the roof of a building.

If air flow from the dryer is restricted, there may be inefficient operation of the dryer, which can waste energy and cause damage to the dryer blower. Of greater concern is the possibility of lint buildup within the exhaust conduit due to non sufficient airflow, which can create a potential fire hazard. Airflow restriction can result due to kinking or crushing of the exhaust conduit or the flexible hose, or can result simply due to friction acting on the air from the surface of the conduit or hose. The friction causes the airflow to slow as the air travels further from the dryer blower. This reduction in air speed allows lint traveling in the airflow to settle, creating a dangerous buildup over time.

The typical exhaust conduit elbow can be used within a wall cavity, attic space or crawl space to provide for angles of turn between 0° and 90°. The typical elbow has a 3.25" radius and is formed of a metal pipe, usually aluminum, which is divided into sections. For example, the elbow may have four sections, each of which may have straight walls, with the two central sections being generally wedge-shaped so that the elbow extends through an angle of turn of approximately 90°. The sections may be connected by crimped or folded metal areas so that the elbow may be flexed slightly to suit the application. The 3.25" radius is very tight and causes airflow restriction and friction loss, which in turn creates more turbulence and restricts efficient airflow much more than straight sections of the exhaust conduit. The airflow restriction and friction loss of a typical elbow has been calculated to be equivalent to the friction loss as 5 linear feet of straight pipe.

To attempt to alleviate efficiency and lint buildup problems, many building codes place a restriction on the permitted length of dryer exhaust conduits. For a typical exhaust conduit having a diameter of approximately 4", many building codes restrict the length of the conduit to 25 feet. Additionally, for every 3.25" elbow introduced in the exhaust conduit to turn the conduit, the permitted length of the conduit is reduced by 5 feet, due to the calculated friction loss in the elbow being equivalent to 5 linear feet of straight pipe. However, space considerations in homes and other buildings often make it difficult to comply with these codes while retaining the greatest amount of usable living space within the building.

It is an object of the present invention to provide an improved elbow for a dryer vent exhaust conduit.

SUMMARY OF THE INVENTION

The invention relates to an elbow for a conduit which may be employed in a dryer exhaust vent. The elbow is formed of two nestable channel sections, each channel section having a generally C-shaped cross-section which may, for example, be substantially semi-circular. Each channel section has a connection mechanism along at least one side thereof such that the two channel sections are joinable to form a substantially tubular conduit, the conduit having a smooth interior surface. Each channel section is curved in an arc to provide a turn to the elbow.

Each channel section may include a flange along at least one side thereof, the connection mechanism being provided on the flange. In one arrangement, each channel section can include a flange along both sides thereof, the connection mechanism being provided on each flange.

In a preferred arrangement, the connection mechanism can be a snap-fit connection mechanism. The connection mechanism can comprise mating apertures and raised tabs. The arc of each channel section may extend around a quarter circle, and/or may extend through approximately 90°. An end of the elbow may have a reduced diameter section to fit inside an adjoining conduit pipe. An end of the elbow may have an increased diameter section to fit outside an adjoining conduit pipe. Additionally, or in the alternative, an end of the elbow may have an indentation to receive a connection seam of an adjoining conduit pipe.

By providing an elbow with a smooth interior surface, and which does not suffer from a reduction in interior diameter, the elbow significantly reduces friction and air turbulence in the airflow being vented from the dryer. Additionally, by providing the elbow in two halves that can be nested together, storage space is minimized, allowing for easier transport of the elbow to the installation site. The elbow according to the inventive arrangements can provide for a 1:1 ratio of length versus calculated friction loss reduction. This can provide a net gain of approximately 4.5' in allowable duct length when used as a replacement to the standard metal elbow used in standard dryer exhaust vents, as it allows for the removal of the 5' penalty in building codes for use of an elbow. This gives greater flexibility in designing the dryer exhaust vent conduit.

DETAILED DESCRIPTION OF THE PREFERRED EMBODIMENTS

The illustrated embodiment is described with reference to a dryer vent elbow, however, it will be appreciated that the invention is applicable to similar pipe and conduit elbows, and the invention is not limited to use with dryer vent or other appliance elbows.

Figure 1:
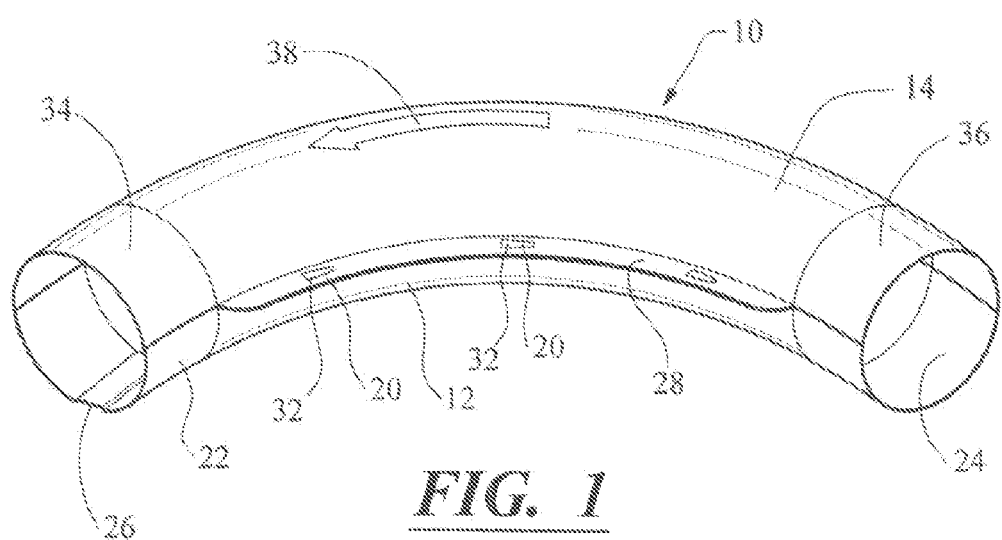
FIG. 1 is a perspective view of a dryer vent elbow in accordance with the inventive arrangements.

Referring to FIG. 1, a dryer exhaust vent conduit elbow 10 according to the inventive arrangements is shown. The elbow 10 may be formed from any suitable material and, in some embodiments, may be formed from a thin metal sheet, for example, aluminum or steel. The elbow may be formed in two interlocking channel sections 12, 14, each forming half of the conduit elbow. The channel sections 12, 14 are each generally C-shaped in cross-section, and in the illustrated embodiment are substantially semi-circular in cross-section. The channel sections are not limited to semi-circular cross-sections and may have any suitable cross-sectional shape, such as elliptical, parabolic, polyhedral, square, U-shaped, etc. The elbow 10 in the illustrated embodiment is in the form of an arc extending through approximately 90° so as to provide a right-angled turn to the conduit, although it will be understood that the elbow may extend through any suitable angle to provide an appropriate bend in an exhaust conduit and is not limited to 90°. The arc of the illustrated elbow 10 extends through a quarter circle in order to provide the 90° angle, however, any suitable arc shape can be employed to form the desired angular bend to the exhaust conduit.

Figure 2:
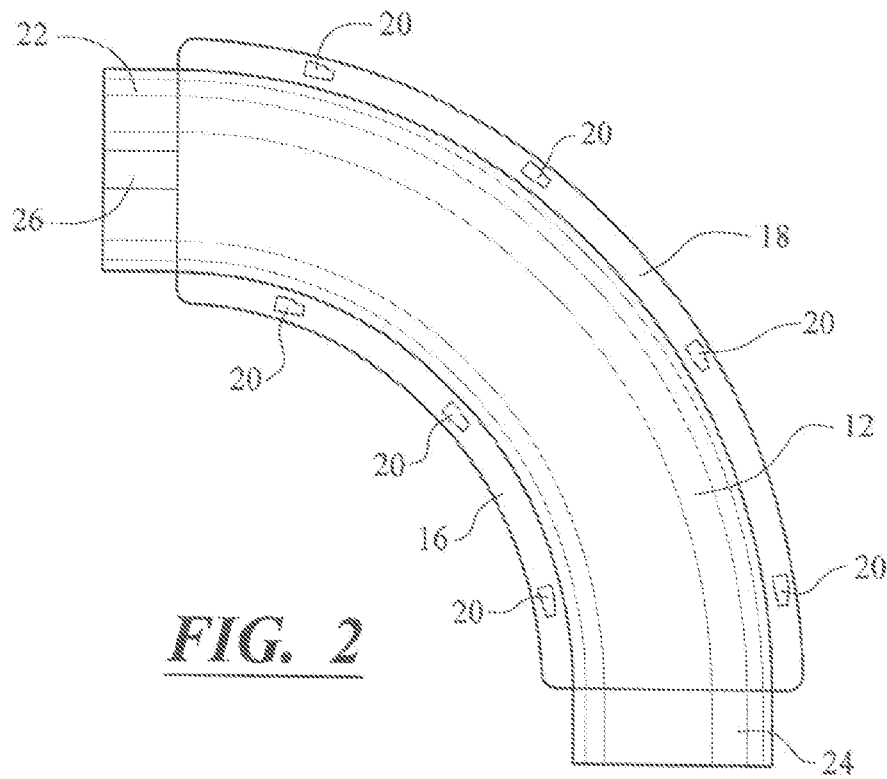
FIG. 2 is a top view of a first channel section of the dryer vent elbow of FIG. 1.

Referring now to FIG. 2, a first channel section 12 of the elbow 10 is illustrated, which is shown in FIG. 1 on the bottom of the elbow, although it will be appreciated that the term "bottom" is used solely in reference to the figures and does not imply any spatial relationship or orientation between the components in use. The elbow channel section 12 can comprise a shaped metal channel having a substantially semi-circular cross-sectional profile, with flanges 16, 18 along each side of the channel. The channel may be curved such that it is in the shape of an arc extended through a quarter circle. The flange 16 may be provided on the interior of the curve of the channel section 12, and may have approximately three raised tabs 20 spaced along the length of the flange. The flange 18 may be provided on the exterior of the curve, and may have approximately four raised tabs 20 spaced along the length of the flange. The number of tabs 20 given is purely illustrative, and the invention is not limited to the arrangement shown in the figures.

Two collars 22, 24 may be provided, one at each end of the channel section 12. The collar 22 can have a slightly reduced diameter compared with the diameter of the main portion of the channel section 12. The collar 24 can have a slightly increased diameter compared with the diameter of the main portion of the channel section 12. The collar 22 can have an indented portion 26.

Figure 3:
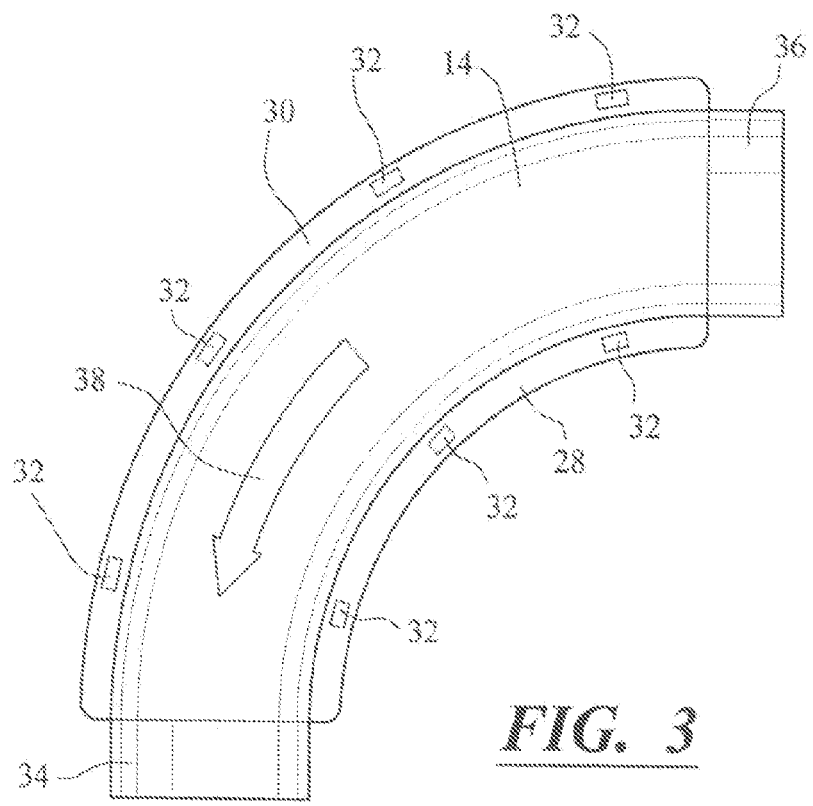
FIG. 3 is a top view of a second channel section of the dryer vent elbow of FIG. 1.

Referring now to FIG. 3, the second channel section 14 of the elbow 10 is illustrated, which is shown on the top in FIG. 1. The term "top" is used solely in reference to the figures and does not imply any spatial relationship or orientation between the components in use. Similar to the first channel section 12, the channel section 14 may be formed of a metal channel having a substantially semi-circular cross-section, which is curved to form the shape of an arc extending through a quarter circle. The edges of the channel may be provided with flanges 28, 30, similar to the flanges 16, 18. The flange 28 may be provided on the interior of the curve of the channel section 14, and may have approximately three apertures 32 spaced along the length of the flange. The flange 30 may be provided on the exterior of the curve, and may have approximately four apertures 32 spaced along the length of the flange.

Two collars 34, 36 may be provided, one at each end of the channel section 14. The collar 34 can have a slightly reduced diameter compared with the diameter of the main portion of the channel section 14. The collar 36 can have a slightly increased diameter compared with the diameter of the main portion of the channel section 14. A raised marking 38, such as an arrow, may be imprinted on the surface of the channel section 14 to provide an indication of the orientation of the elbow in use with respect to the flow of air through the elbow.

The elbow 10 may be easily transported to an installation site disassembled. The two channel sections 12, 14 may nest together to reduce the storage space needed. The elbow 10 may be quickly assembled on site by bringing the two channel sections 12, 14 together, aligning flange 16 with flange 28 and flange 18 with flange 30. The raised tabs 20 can be snapped into apertures 32 to hold the channel sections 12, 14 together. The locking of the tabs 20 and the apertures 32 may be achieved using a slight twisting motion of the channel sections 12, 14. The collars 22, 34 align to form an end that will be a snug fit into a standard exhaust conduit. The indented portion 26 accommodates a pipe joint in the standard exhaust conduit. The collars 24, 36 align to form an end that will be a snug fit around the outside of a standard exhaust conduit. The elbow 10 thus can be attached using a simple push fit to lengths of exhaust conduit or to a flexible dryer hose.

The interior of the elbow 10 when assembled can generally smooth, with some variations in the surface, particularly where the two channel sections 12, 14 are joined together. "Smooth" understood to mean that the interior surface of the elbow is generally free of turbulence causing obstructions, projections, pleating and other surface features. Natural variations in the surface, seams, varying angles of curvature and/or corners are to be considered as falling within the definition of "smooth" used herein.

The illustrated elbow has an internal diameter of 4", a radius of 10" and a length (excluding collars) of 18". It will be appreciated that the sizes given are purely exemplary and that any suitable sizes may be employed for the conduit elbow 10, depending on the application. The elbow 10 may be scaled to be larger or smaller than the dimensions given, and may have the same shape as the illustrated embodiment. Alternatively, if a different angle of curvature is desired, the radius may be altered while still using the same internal diameter and length of the illustrated elbow. Alternatively, a different length of elbow may be used with the same internal diameter and radius of curvature to provide a different angle of curvature. Yet further, a different internal diameter may be used, with the same or different radius of curvature and length. It will also be appreciated that different countries and states have different building codes and accepted methodology and calculations for determining friction loss from pipes, and the sizes of the pipes and radii of curvature may be selected to produce a desired result that will be acceptable under the relevant building code and accepted friction loss calculation method.

Based on accepted ASHRAE methodology for calculating friction loss in ducts and fittings, it has been determined that a 10" radius elbow with a smooth interior extending through approximately 90° provides for about an 18" friction loss. As the friction loss equivalent length is the same as the length of the elbow 10 in the illustrated embodiment, the elbow 10 provides for a 1:1 ratio of length versus calculated friction loss reduction. The elbow 10 thus can provide a net gain of approximately 4.5 feet in allowable duct length when used as a replacement to the standard metal elbow used in standard dryer exhaust vents, as it allows for the removal of the 5 feet penalty in building codes for use of an elbow. Thus, an elbow in accordance with the inventive arrangements gives greater flexibility in designing the dryer exhaust vent conduit.

The illustrated embodiment employs the use of two flanges per channel section, one on each side of each channel section 12, 14. In alternative arrangements, only one flange per channel section may be employed. The other side of the channel sections 12, 14 may be connectable using alternative connection methods, such as a tongue and groove type arrangement, or other snap fit joining methods. In yet further arrangements, both sides of the channel sections 12, 14 may be connectable by alternative connection methods.

Although the illustrated embodiment is formed with two separate channel sections 12, 14, the elbow may be formed as two channel sections that are joined together at a connecting point or points on one side of the elbow. For example, the channel sections may be joined with a hinge, or may be formed from one piece of material that may be folded, for example at a score line at the connecting point or points, to form the elbow 10. Alternatively, the connecting point or points may be at one end of the elbow. These arrangements may be transported in a nested configuration with multiple elbows stacked on top of one another, although are not transportable in as compact an arrangement as when using two separate channel sections 12, 14.

While preferred embodiments of the invention have been illustrated and described, it will be clear the invention is not so limited. Numerous modifications, changes, substitutions and equivalents will occur to those skilled in the art without departing from the spirit and scope of the invention as described in the claims.

What is claimed is:

1. An elbow for an exhaust conduit of a drying appliance, comprising:

two nestable channel sections, each channel section having a generally C-shaped cross-section;

each channel section having a connection mechanism along at least one side thereof such that the two channel sections are joinable to form a substantially tubular conduit, the conduit having a smooth interior surface substantially without obstructions;

wherein each channel section is curved in an arc to provide a turn to the elbow;

wherein each channel section comprises a flange along each side of the channel section;

wherein the connection mechanism comprises lockable mating apertures and raised tabs, at least one connection mechanism being positioned on each flange to couple the channel sections together without protruding into the channel created by the channel sections;

wherein the elbow provides a 1:1 ratio of length versus calculated friction loss reduction to airflow passing through the elbow from the drying appliance; and wherein the nestable channel sections are formed of a thin metal sheet such that the channel sections may be twisted to lock the tabs and apertures together to securely fasten the two channel sections together.

2. The elbow according to claim 1, wherein the connection mechanism is a snap-fit connection mechanism.

3. The elbow according to claim 1, wherein the arc of each channel section extends around a quarter circle.

4. The elbow according to claim 1, wherein the arc of each channel section extends through approximately 90°.

5. The elbow according to claim 1, wherein an end of the elbow comprises a reduced diameter section to fit inside an adjoining conduit pipe.

6. The elbow according to claim 1, wherein an end of the elbow comprises an increased diameter section to fit outside an adjoining conduit pipe.

7. The elbow according to claim 1, wherein an end of the elbow comprises an indentation to receive a connection seam of an adjoining conduit pipe.

8. The elbow according to claim 1, wherein each channel section has a substantially semi-circular cross-section.

* * * * *